United States Patent
Kusaka

(10) Patent No.: US 12,554,113 B2
(45) Date of Patent: Feb. 17, 2026

(54) MICROSCOPE APPARATUS AND LIGHT SOURCE APPARATUS

(71) Applicant: Evident Corporation, Nagano (JP)

(72) Inventor: Kenichi Kusaka, Nagano (JP)

(73) Assignee: Evident Corporation, Nagano (JP)

( * ) Notice: Subject to any disclaimer, the term of this patent is extended or adjusted under 35 U.S.C. 154(b) by 357 days.

(21) Appl. No.: 18/373,538

(22) Filed: Sep. 27, 2023

(65) Prior Publication Data

US 2024/0126062 A1 Apr. 18, 2024

(30) Foreign Application Priority Data

Oct. 5, 2022 (JP) ................. 2022-160678

(51) Int. Cl.
*G02B 21/06* (2006.01)
*G02B 21/00* (2006.01)
*G02B 21/14* (2006.01)

(52) U.S. Cl.
CPC ......... *G02B 21/06* (2013.01); *G02B 21/0092* (2013.01); *G02B 21/14* (2013.01)

(58) Field of Classification Search
None
See application file for complete search history.

(56) References Cited

FOREIGN PATENT DOCUMENTS

| CN | 203012216 U | 6/2013 | |
|---|---|---|---|
| JP | H05341200 A | 12/1993 | |
| JP | 2006084775 A | 3/2006 | |
| KR | 20100005866 A * | 1/2010 | ........... G02B 21/361 |

* cited by examiner

*Primary Examiner* — Phu Vu
(74) *Attorney, Agent, or Firm* — Holtz, Holtz & Volek PC

(57) ABSTRACT

A microscope apparatus includes a color temperature adjustment unit. The color temperature adjustment unit includes, in order from an incident side of light: a first polarizer that converts the light into linearly polarized light; a ¼-wave plate that converts at least light of a predetermined wavelength of the linearly polarized light into circularly polarized light, the ¼-wave plate being fixed in a predetermined orientation relative to the first polarizer; and a second polarizer that extracts a predetermined polarization component, the second polarizer being disposed to be rotatable relative to the first polarizer. A difference between a phase amount with respect to light of 435 nm and a phase amount with respect to light of 635 nm of the ¼-wave plate is 30 degrees or more.

16 Claims, 6 Drawing Sheets

MICROSCOPE APPARATUS AND LIGHT SOURCE APPARATUS

CROSS REFERENCE TO RELATED APPLICATIONS

This application is based upon and claims the benefit of priority from prior Japanese Patent Application No. 2022-160678, filed Oct. 5, 2022, the entire contents of which are incorporated herein by this reference.

BACKGROUND OF THE INVENTION

Field of the Invention

The disclosure herein relates to a microscope apparatus and a light source apparatus.

Description of the Related Art

Conventionally, halogen lamps have been mainly used as a light source of a microscope. However, in recent years, switching from the halogen lamps to LEDs has been progressing. On the other hand, the halogen lamps and the LEDs are different in color temperature, and therefore in some cases, users that have switched from the halogen lamp to the LED make a request to perform observation at a previous color temperature.

However, the color temperature of the LEDs is fixed, whereas the color temperature of the halogen lamps changes according to an applied voltage. Specifically, the halogen lamps appear bluish at the maximum output, whereas the halogen lamps appear yellowish in the state of a relatively low output. Stated another way, users of the halogen lamps see different colors depending on usual usages. Therefore, even if a supplier side provides LEDs in combination with a predetermined color conversion filter in advance, colors that users had seen when using the halogen lamps are not always reproduced.

A technique pertaining to such a technical problem is described in, for example, JP 2006-084775 A. JP 2006-084775 A describes a configuration in which the color temperature of illumination light is adjusted by changing the balance among amounts of light of wavelength ranges.

SUMMARY OF THE INVENTION

A microscope apparatus in one aspect of the present invention includes a color temperature adjustment unit. The color temperature adjustment unit includes, in order from an incident side of light: a first polarizer that converts the light into linearly polarized light; a ¼-wave plate that converts at least light of a predetermined wavelength of the linearly polarized light into circularly polarized light, the ¼-wave plate being fixed in a predetermined orientation relative to the first polarizer; and a second polarizer that extracts a predetermined polarization component, the second polarizer being disposed to be rotatable relative to the first polarizer, and a difference between a phase amount with respect to light of 435 nm and a phase amount with respect to light of 635 nm of the ¼-wave plate is 30 degrees or more.

A light source apparatus in one aspect of the present invention includes a semiconductor light source that emits white light, and a color temperature adjustment unit. The color temperature adjustment unit includes, in order from an incident side of light: a first polarizer that converts the light into linearly polarized light; a ¼-wave plate that converts at least light of a predetermined wavelength of the linearly polarized light into circularly polarized light, the ¼-wave plate being fixed in a predetermined orientation relative to the first polarizer; and a second polarizer that extracts a predetermined polarization component, the second polarizer being disposed to be rotatable relative to the first polarizer, and a difference between a phase amount with respect to light of 435 nm and a phase amount with respect to light of 635 nm of the ¼-wave plate is 30 degrees or more.

BRIEF DESCRIPTION OF THE DRAWINGS

The present invention will be more apparent from the following detailed description when the accompanying drawings are referenced.

DESCRIPTION OF THE EMBODIMENTS

In JP 2006-084775 A, a reflective element is used. However, a configuration including the reflective element easily causes an apparatus to increase in size, and in some cases, it is difficult to incorporate the configuration into an existing microscope apparatus. Therefore, there is a request for a new technique for adjusting color temperature.

In view of the circumstances described above, an object in one aspect of the present invention is to provide a new technique that enables color temperature of light to be easily adjusted.

First Embodiment

Figure 1:
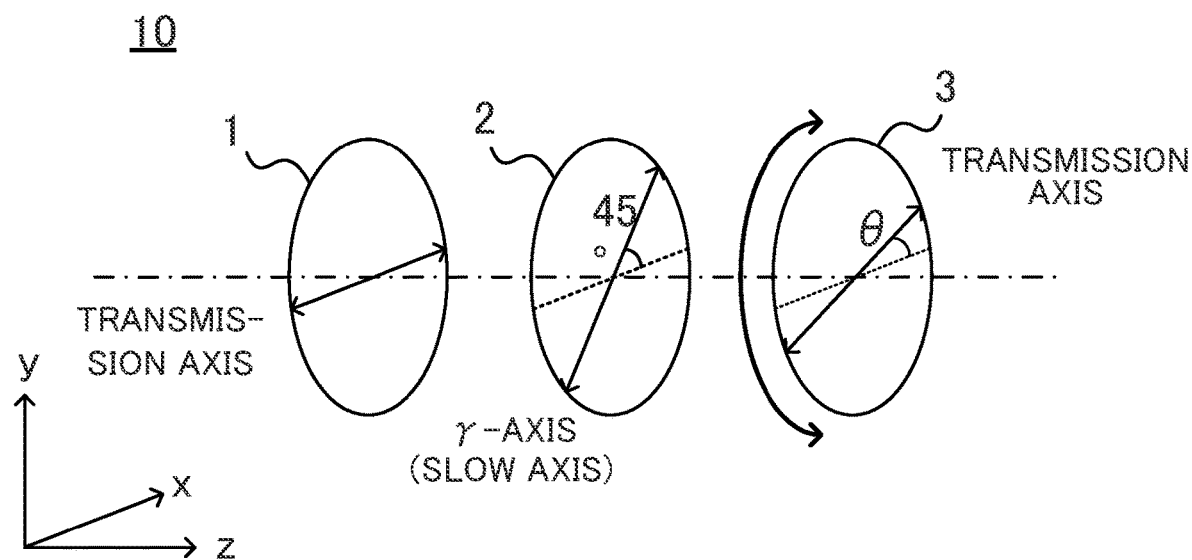
FIG. 1 is a diagram illustrating a configuration of a color temperature adjustment unit according to a first embodiment.

FIG. 1 is a diagram illustrating a configuration of a color temperature adjustment unit 10 according to the present embodiment. The color temperature adjustment unit 10 illustrated in FIG. 1 is a unit that can emit light having an adjusted color temperature in response to incident light, and is used, for example, in a state where the color temperature adjustment unit 10 is disposed in a light path of an optical instrument on which white light is made incident.

The color temperature adjustment unit 10 includes a movable portion that is rotatable. The color temperature adjustment unit 10 can easily adjust color temperature according to a rotation direction and an amount of rotation of this movable portion, and can cope with a variety of color temperatures expected by users.

The color temperature adjustment unit 10 includes a polarizer 1, a ¼λ plate 2, and a polarizer 3 that are disposed in this order from a light incident side, as illustrated in FIG. 1. The polarizer 1 is a first polarizer of the color temperature adjustment unit 10, and converts light into linearly polarized light. It is sufficient if the polarizer 1 converts light into linearly polarized light, and for example, an arbitrary polarizer, such as a polarizer that uses a wire grid or another polarizer, can be employed. Note that a transmission axis of the polarizer 1 is disposed in a direction that matches an X-axis.

The ¼λ plate 2 is a retarder of the color temperature adjustment unit 10, and gives a relative phase amount (hereinafter simply referred to as a phase amount) between an ordinary ray and an extraordinary ray to convert linearly polarized light into circularly polarized light. The ¼λ plate 2 is made of, for example, rock crystal, which is a birefringent material. The ¼λ plate 2 is fixed in a predetermined orientation relative to the polarizer 1. Specifically, a slow axis of the ¼λ plate 2 is directed to a direction of 45° relative to a polarization plane (an electric field vector) of linearly polarized light that has been emitted from the polarizer 1. Note that the polarization plane of the linearly polarized light that has been emitted from the polarizer 1 is parallel to the transmission axis of the polarizer 1, and therefore it is sufficient if the polarizer 1 and the ¼λ plate 2 are disposed in such a way that the transmission axis of the polarizer 1 and the slow axis of the ¼λ plate 2 form an angle of 45°.

The polarizer 3 is a second polarizer of the color temperature adjustment unit 10, and extracts a predetermined polarization component from the circular polarized light that has been emitted from the ¼λ plate 2. Specifically, linearly polarized light having a polarization plane that is parallel to a transmission axis of the polarizer 3 is extracted. The polarizer 3 is disposed to be rotatable relative to the ¼λ plate 2. In the color temperature adjustment unit 10 configured as described above, the polarizer 3 is rotated so that linearly polarized light having an arbitrary polarization plane can be extracted. In FIG. 1, it is assumed that an angle formed by the transmission axis of the polarizer 3 and the X-axis is θ.

Figure 2:
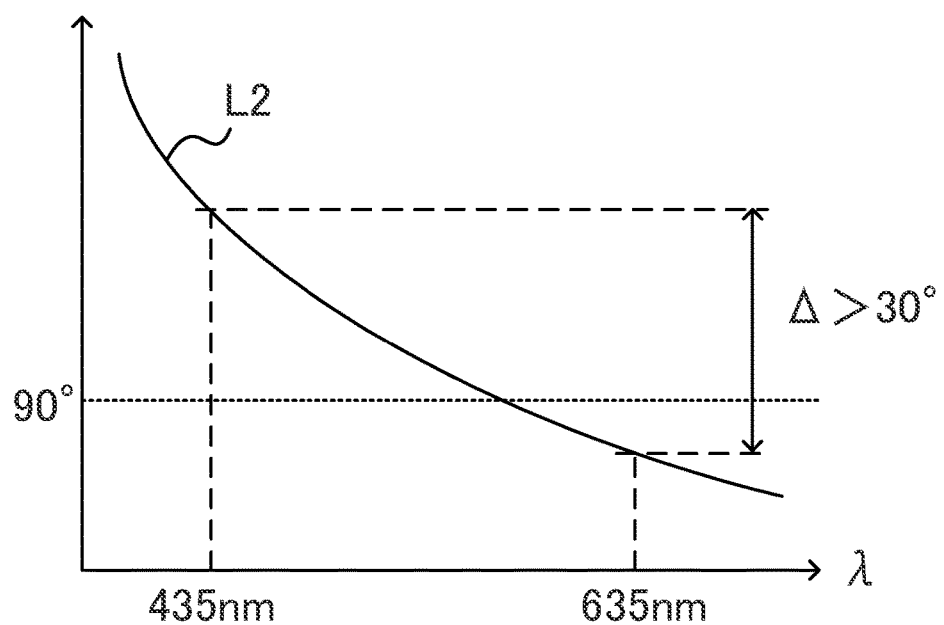
FIG. 2 is a diagram for explaining characteristics of a ¼λ plate included in the color temperature adjustment unit illustrated in FIG. 1.
Figure 3:
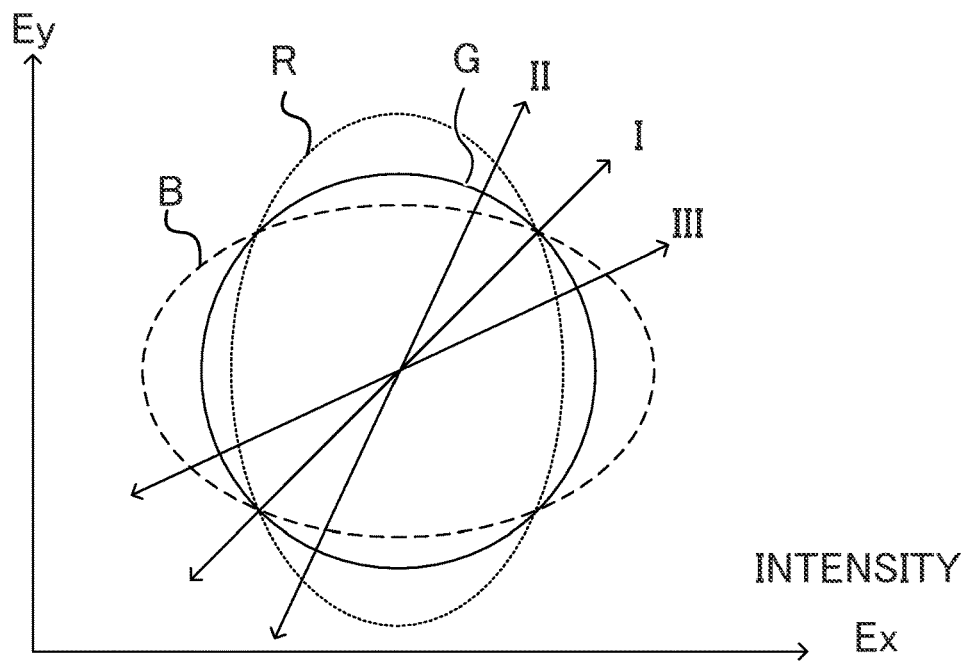
FIG. 3 is a diagram depicting, for each wavelength, the locus of an electric field vector of polarized light that has been emitted from the ¼λ plate included in the color temperature adjustment unit illustrated in FIG. 1.

FIG. 2 is a diagram for explaining characteristics of the ¼λ plate 2 included in the color temperature adjustment unit 10 illustrated in FIG. 1. FIG. 3 is a diagram depicting, for each wavelength, the locus of an electric field vector of polarized light that has been emitted from the ¼λ plate 2.

Figure 4:
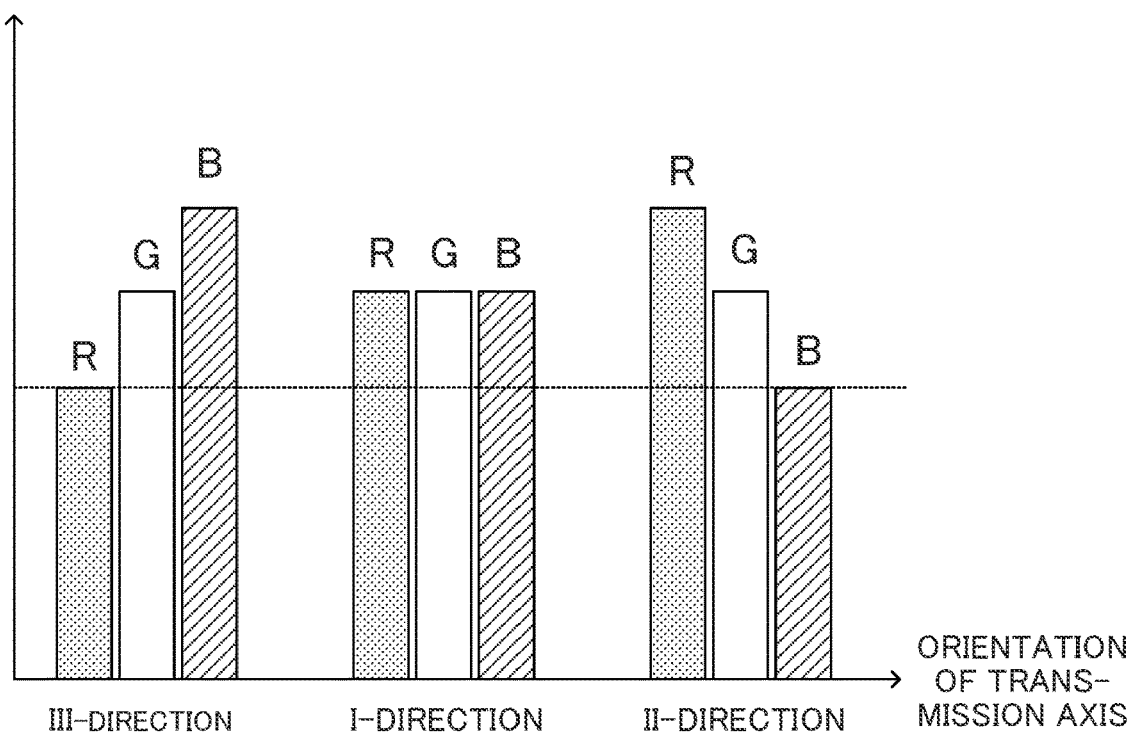
FIG. 4 is a diagram illustrating a relationship between an orientation of a transmission axis of a polarizer included in the color temperature adjustment unit illustrated in FIG. 1 and an intensity for each wavelength included in transmitted light.

FIG. 4 is a diagram illustrating a relationship between an orientation of the transmission axis of the polarizer 3 and an intensity for each wavelength included in transmitted light.

If light that has passed through the ¼λ plate 2 is circularly polarized light, the light includes a polarization component having a constant intensity regardless of a polarization direction. Therefore, even if an orientation of the transmission axis of the polarizer 3 is changed, the intensity of the linearly polarized light that has passed through the polarizer 3 does not change. However, if a phase amount generated in the ¼λ plate 2 deviates from π/2 (stated another way, a difference in a light path length deviates from ¼λ), light that has passed through the ¼λ plate 2 is not formed into circularly polarized light, but is formed into elliptically polarized light. In the elliptically polarized light, the intensity of a polarization component changes according to a polarization direction. Therefore, if an orientation of the transmission axis of the polarizer 3 is changed, the intensity of linearly polarized light that has passed through the polarizer 3 changes.

A phase amount generated in the ¼λ plate 2 is expressed by $2\pi d(|no-ne|)/\lambda 0$, where a thickness of the ¼λ plate 2 is d, and refractive indices for an ordinary ray and an extraordinary ray of the ¼λ plate 2 are no and ne, respectively, and the phase amount depends on an incident wavelength. Although no and ne change according to a wavelength, in general, a change in $|no-ne|$ at a time when the wavelength has changed is different from a change in the wavelength λ0. Therefore, $2\pi d(|no-ne|)/\lambda 0$ is not constant with respect to the wavelength. Accordingly, in practice, the ¼λ plate 2 has been designed to generate a phase amount of π/2 at a predetermined wavelength, and generates a phase amount that is smaller or larger than π/2 at many other wavelengths. Stated another way, the ¼λ plate 2 converts at least light of a predetermined wavelength of linearly polarized light that has entered from the polarizer 1 into circularly polarized light, and converts light of the other wavelengths into elliptically polarized light.

In general, a phase amount generated in a ¼λ plate made of a specified birefringent material is large at a short wavelength, and is small at a long wavelength, as illustrated in FIG. 2. Therefore, for example, when using, as an example, a case where it has been designed that a phase amount of π/2 is generated with respect to green (G), in light that has passed through the ¼λ plate 2, light of green (G) is formed into circularly polarized light, and rays of light of red (R) and blue (B) are formed into rays of elliptically polarized light having orientations different from each other, as illustrated in FIG. 3.

In a case where elliptically polarized light that faces a direction that changes according to a wavelength, as illustrated in FIG. 3, enters the polarizer 3, a change in an orientation of the transmission axis of the polarizer 3 causes a change in the balance among amounts of light of wavelengths included in the linearly polarized light that has passed through the polarizer 3, as illustrated in FIG. 4.

For example, in a case where the transmission axis of the polarizer 3 is directed to the I-direction (an inclination of 45 degrees from the X-axis) illustrated in FIG. 3, R, G, and B are transmitted at almost the same intensity, as illustrated in FIG. 4. This causes a field of view to be whitish. On the other hand, if the transmission axis of the polarizer 3 is directed to the III-direction illustrated in FIG. 3, R decreases, and B increases, as illustrated in FIG. 4. This causes a field of view to be bluish. In contrast, if the transmission axis of the polarizer 3 is directed to the II-direction illustrated in FIG. 3, R increases, and B decreases. This causes a field of view to be yellowish (reddish).

As described above, by utilizing a property of the ¼λ plate 2 in which a phase amount changes according to a wavelength, the balance among amounts of light of wavelengths that pass through the polarizer 3 can be adjusted, and this enables color temperature to be adjusted.

Incidentally, in general, in a wave plate such as a ¼λ plate, a variation in a phase amount according to a wavelength has been designed to be as small as possible unless the wave plate is used with respect to monochromatic light. On the other hand, the ¼λ plate 2 that is used in the color temperature adjustment unit 10 positively utilizes this variation in a phase amount, in contrast to a typical ¼λ plate that has been conventionally used.

Specifically, the ¼λ plate 2 is configured in such a way that the balance among amounts of light of wavelengths sufficiently changes to enable humans to visually recognize a change by using a direction of an electric field vector. More specifically, the ¼λ plate 2 is configured in such a way that a difference between a phase amount with respect to light of 435 nm and a phase amount with respect to light of 635 nm of the ¼-wave plate is 30 degrees or more, as illustrated in FIG. 2. If a difference in a phase amount is 30 degrees or more, 20 mireds or more can be secured in terms of color conversion capability and in particular, B-R conversion capability, and this enables humans to visually recognize a change in color.

Note that B-R conversion capability v is expressed in such a way that v=221 (log Tr–log Tb). Tr is a mean value (%) of transmittances of the ¼λ plate 2 at wavelengths of 610 nm, 635 nm, and 655 nm, and Tb is a mean value (%) of transmittances of the ¼λ plate 2 at wavelengths of 405 nm, 435 nm, and 465 nm. Note that a unit of the B-R conversion capability v is mired. Hereinafter, a B-R conversion capability calculated by respectively using transmittances at 635 nm and 435 nm for Tr and Tb is described as v' for simplification of calculation. A B-R conversion capability of the ¼λ plate 2 in a case where the ¼λ plate 2 is made of rock crystal is described below. Note that an angle θ is an angle formed between the transmission axis of the polarizer 3 and the X-axis, as described above. In other words, the angle θ is a relative angle of the transmission axis of the polarizer 3 relative to the transmission axis of the polarizer 1.

Figure 5:
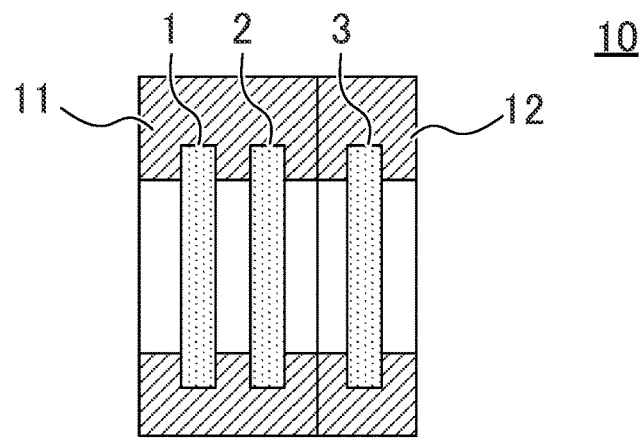
FIG. 5 is a diagram illustrating a frame structure of the color temperature adjustment unit illustrated in FIG. 1.

Phase amount at 635 nm: 76.82 degrees
Phase amount at 435 nm: 116.89 degrees
Phase amount at 635 nm—phase amount at 435 nm: 40.07 degrees
Color conversion capability v' at angle θ of 0 degrees of polarizer 3: 38.74 mireds
Color conversion capability v' at angle θ of 90 degrees of polarizer 3: −30.32 mireds FIG. 5 is a diagram illustrating a frame structure of the color temperature adjustment unit 10. As illustrated in FIG. 5, the color temperature adjustment unit 10 includes a frame 11, and a frame 12 that is disposed to be rotatable relative to the frame 11. The ¼λ plate 2 is fixed in a predetermined orientation relative to the polarizer 1, and therefore the polarizer 1 and the ¼λ plate 2 are supported by the same frame 11. On the other hand, the polarizer 3 is disposed to be rotatable relative to the ¼λ plate 2, and therefore the polarizer 3 is supported by the frame 12 that is different from the frame 11 that supports the ¼λ plate 2. As a result, in the color temperature adjustment unit 10, the relative rotation of the frame 12 relative to the frame 11 enables color temperature to be adjusted.

Figure 6:
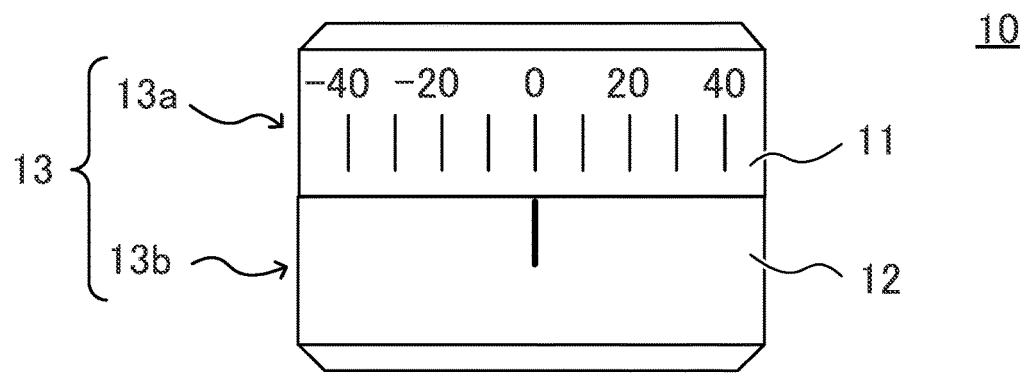
FIG. 6 is a diagram illustrating an indicator of the color temperature adjustment unit illustrated in FIG. 1.

FIG. 6 is a diagram illustrating an indicator 13 of the color temperature adjustment unit 10. The color temperature adjustment unit 10 may include the indicator 13 relating to color conversion capability, as illustrated in FIG. 6. The indicator 13 includes, for example, a scale 13a that is added to the frame 11, and a reference 13b that is added to the frame 12. The scale 13a indicates, for example, the B-R conversion capability described above in mireds.

It is sufficient if the indicator 13 is configured in such a way that the reference 13b indicates a different value of the scale 13a according to the rotation of the polarizer 3 (the frame 12) relative to the polarizer 1 (the frame 11). Therefore, the scale 13a may be added to the frame 12, and the reference 13b may be added to the frame 11. The indicator 13 converts an amount of adjustment of color temperature into numerical values, and this enables color to be easily reproduced.

Figure 7:
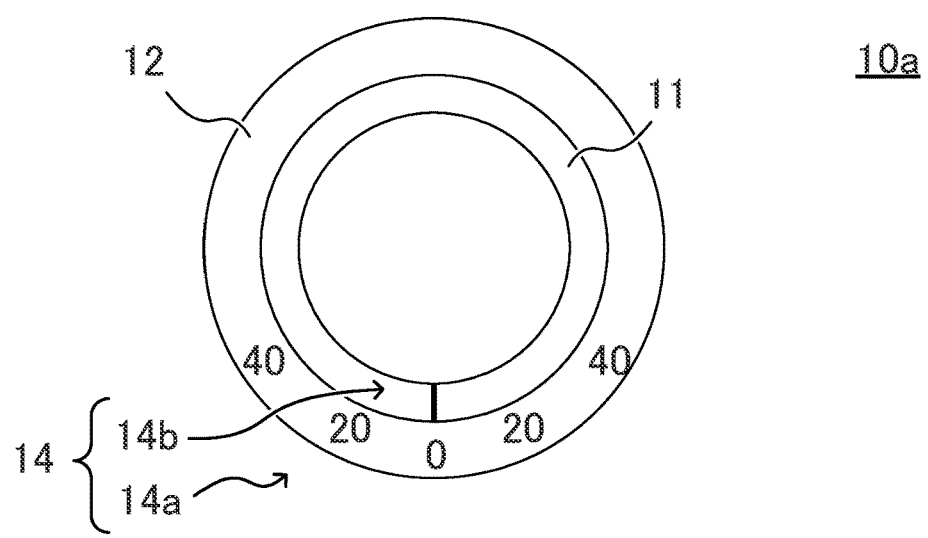
FIG. 7 is a diagram illustrating an indicator of a color temperature adjustment unit in a variation.

FIG. 7 is a diagram illustrating an indicator 14 of a color temperature adjustment unit 10a in a variation. The color temperature adjustment unit 10a is similar to the color temperature adjustment unit 10 excluding a point where the indicator 14 is included instead of the indicator 13. The indicator 13 is provided on side faces of the frame 11 and the frame 12 that have a cylindrical shape, whereas the indicator 14 is provided on end faces in an axial direction of the frame 11 and the frame 12. As illustrated as the color temperature adjustment unit 10 and the color temperature adjustment unit 10a, a position where an indicator is provided is not particularly limited, and the indicator may be provided in an arbitrary position of the color temperature adjustment unit if users can recognize the indicator.

As described above, the color temperature adjustment unit 10 enables the color temperature of light to be adjusted by only rotating the movable portion. In particular, in the color temperature adjustment unit 10, the polarizer 1, the ¼ plate 2, and the polarizer 3 are arranged in a traveling direction of light, and this enables a reduction in thickness and compactly housing in a single unit. Furthermore, a direction of emitted light can be maintained in the same direction as a direction of incident light. Accordingly, the color temperature adjustment unit 10 can be relatively easily disposed in a light path of an existing optical instrument. Furthermore, the polarizer 1, the ¼λ plate 2, and the polarizer 3 are disposed to be close to each other without another optical element interposed therebetween, and this can avoid the non-designed irregularity of polarized light. Accordingly, a high color conversion capability, as designed, can be achieved.

Second Embodiment

Figure 8:
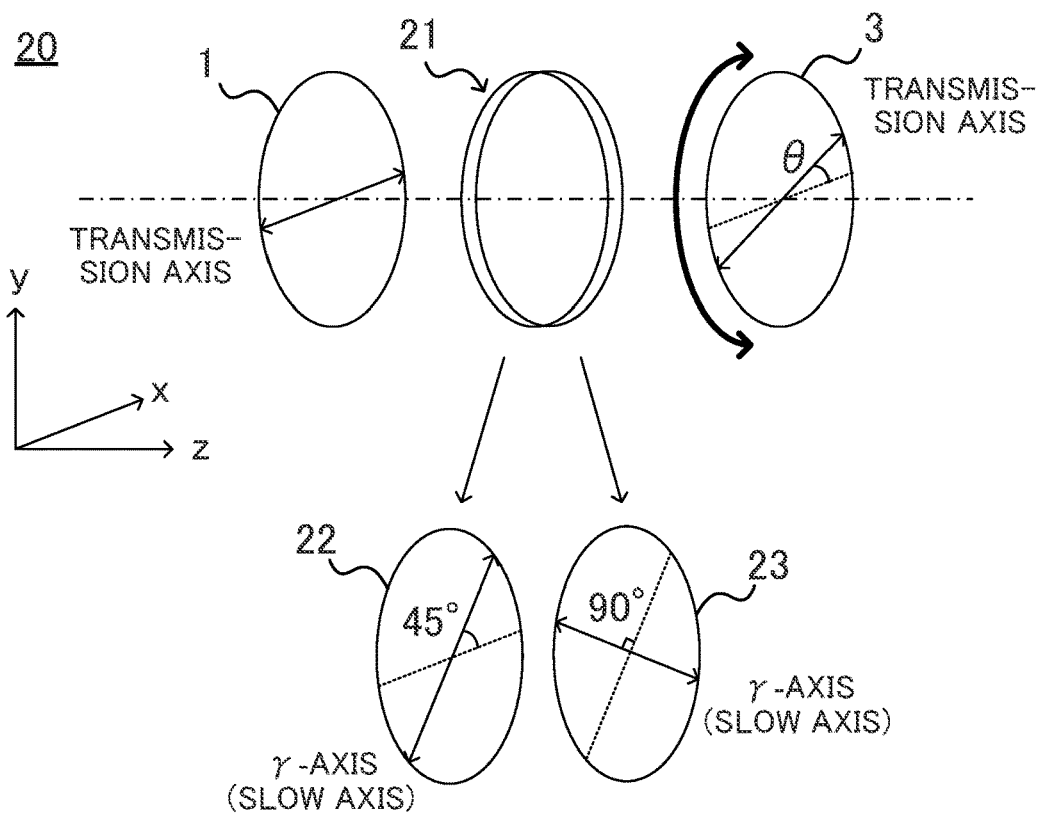
FIG. 8 is a diagram illustrating a configuration of a color temperature adjustment unit according to a second embodiment.
Figure 9:
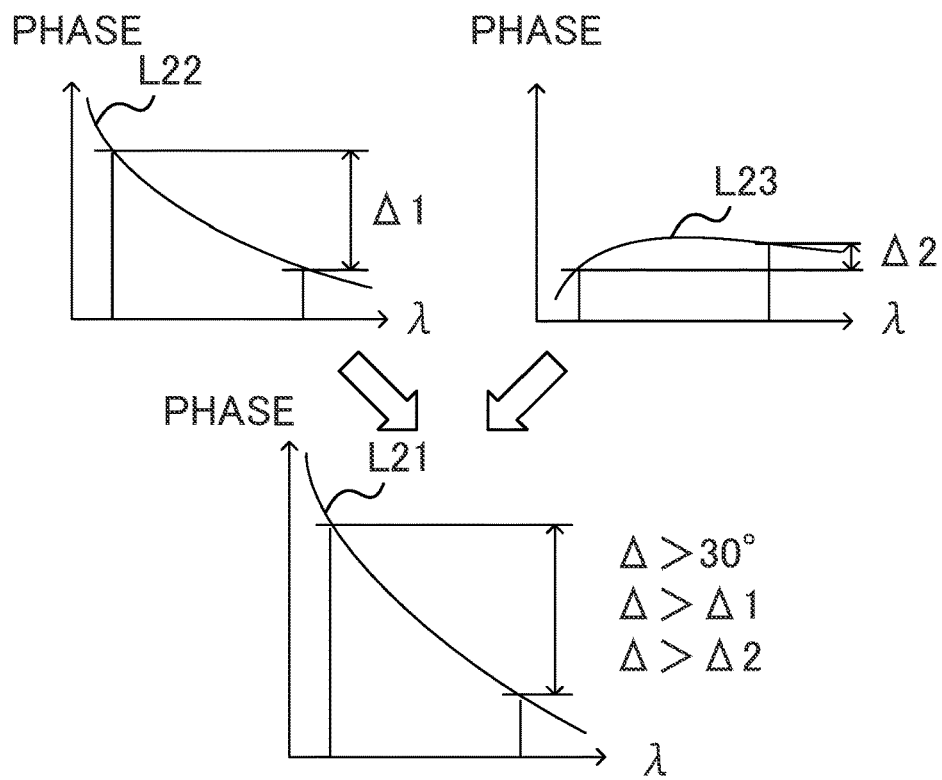
FIG. 9 is a diagram for explaining characteristics of a ¼λ plate included in the color temperature adjustment unit illustrated in FIG. 8.

FIG. 8 is a diagram illustrating a configuration of a color temperature adjustment unit 20 according to the present embodiment. FIG. 9 is a diagram for explaining characteristics of a ¼λ plate included in the color temperature adjustment unit 20. The color temperature adjustment unit 20 illustrated in FIG. 8 is different from the color temperature adjustment unit 10 in that a ¼λ plate 21 is included instead of the ¼λ plate 2. In the other points, the color temperature adjustment unit 20 is similar to the color temperature adjustment unit 10, and it is desirable that the color temperature adjustment unit 20 also include the indicator 13.

The ¼λ plate 21 is configured in such a way that a difference between a phase amount with respect to light of 435 nm and a phase amount with respect to light of 635 nm of the ¼λ plate 21 is 30 degrees or more, similarly to the ¼λ plate 2. The ¼λ plate 2 is made of a single birefringent material such as rock crystal. In contrast, the ¼λ plate 21 includes two types of birefringent materials, a birefringent material 22 and a birefringent material 23, that are disposed to have slow axes orthogonal to each other, and are different in chromatic dispersion, as illustrated in FIG. 8. In this point, the ¼λ plate 21 is different from the ¼λ plate 2.

A wave plate made of two different types of materials is conventionally known as an achromatic wave plate. The achromatic wave plate has been designed in such a way that a combination of materials that are different in chromatic dispersion causes chromatic dispersion of one material to compensate for chromatic dispersion of another material to substantially remove chromatic dispersion. In contrast, the ¼λ plate 21 has been intentionally designed in such a way that chromatic dispersion (a difference in a phase amount between wavelengths) increases. In this point, the ¼λ plate 21 is significantly different from a conventional achromatic wave plate.

Specifically, in the ¼λ plate 21, as illustrated in FIG. 8, the birefringent material 22 having chromatic dispersion that is larger than chromatic dispersion of the birefringent material 23 and the birefringent material 23 having chromatic dispersion that is smaller than chromatic dispersion of the birefringent material 22 are disposed in such a way that slow axes are orthogonal to each other. As a result, as illustrated in FIG. 9, the entirety of the ¼λ plate 21 can achieve chromatic dispersion (a difference in a phase amount Δ) that is larger than chromatic dispersion (a difference in a phase amount Δ1 or Δ2) of each of the birefringent material 22 and the birefringent material 23. Note that the birefringent material 22 is disposed in such a way that a slow axis of the birefringent material 22 is inclined by 45 degrees relative to the transmission axis of the polarizer 1.

A desirable material having larger chromatic dispersion of the birefringent material 22 is, for example, rock crystal. A desirable material having smaller chromatic dispersion of the birefringent material 23 is, for example, a polymeric film such as cellophane. Note that specific configuration examples (1) to (3) of the ¼λ plate 21 made of rock crystal and a polymeric film and their B-R conversion capabilities are described below. It can be confirmed that all have a sufficient B-R conversion capability.

(1) Combination of ⅔-Wave Plate Made of Rock Crystal and ¼-Wave Plate Made of Polymeric Film
    Phase amount at 635 nm: 73.50 degrees
    Phase amount at 435 nm: 135.75 degrees
    Phase amount at 635 nm—phase amount at 435 nm: 62.25 degrees
    Color conversion capability v' at angle θ of 0 degrees of polarizer 3: 72.35 mireds
    Color conversion capability v' at angle θ of 90 degrees of polarizer 3: −41.94 mireds (2) Combination of ¾-Wave Plate Made of Rock Crystal and ⅔-Wave Plate Made of Polymeric Film
    Phase amount at 635 nm: 70.19 degrees
    Phase amount at 435 nm: 154.61 degrees
    Phase amount at 635 nm—phase amount at 435 nm: 84.42 degrees
    Color conversion capability v' at angle θ of 0 degrees of polarizer 3: 126.13 mireds
    Color conversion capability v' at angle θ of 90 degrees of polarizer 3: −50.75 mireds (3) Combination of 1-Wave Plate Made of Rock Crystal and ¾-Wave Plate Made of Polymeric Film
    Phase amount at 635 nm: 66.87 degrees
    Phase amount at 435 nm: 173.47 degrees
    Phase amount at 635 nm—phase amount at 435 nm: 106.60 degrees
    Color conversion capability v' at angle θ of 0 degrees of polarizer 3: 257.28 mireds
    Color conversion capability v' at angle θ of 90 degrees of polarizer 3: −57.01 mireds The color temperature adjustment unit 20 also enables color temperature of light to be easily adjusted by only rotating the movable portion, and effects that are similar to effects of the color temperature adjustment unit 10 can be exhibited. Furthermore, the color temperature adjustment unit 20 is also similar to the color temperature adjustment unit 10 in that the color temperature adjustment unit 20 is compactly configured and can be relatively easily disposed in a light path of an existing optical instrument, and that the irregularity of polarized light is avoided and high color conversion performance can be achieved. Moreover, by employing the color temperature adjustment unit 20, a combination of plural birefringent materials can achieve chromatic dispersion that is higher than chromatic dispersion of the color temperature adjustment unit 10. This can provide color temperature adjustment capability that is higher than color temperature adjustment capability of the color temperature adjustment unit 10.

Third Embodiment

Figure 10:
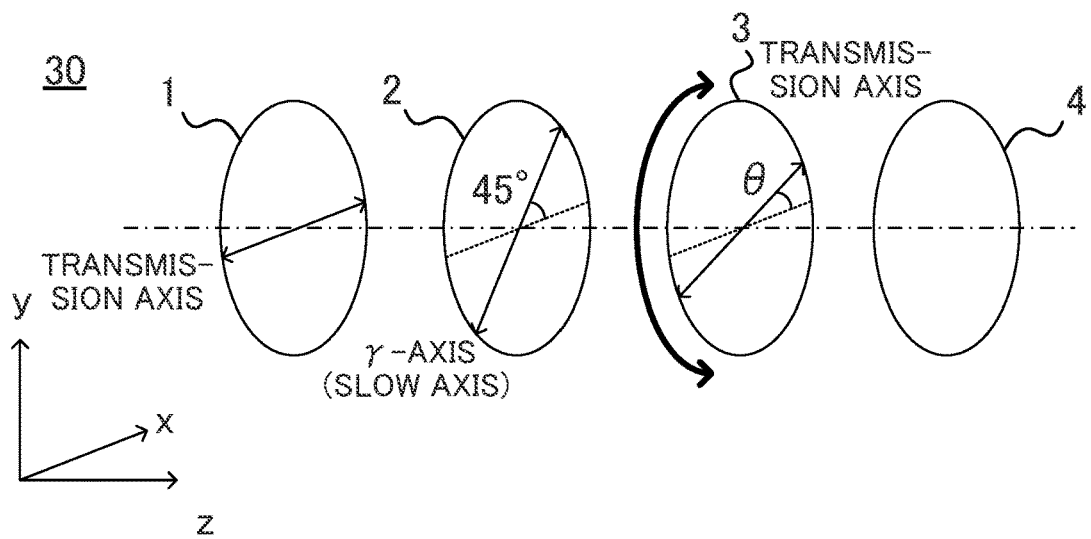
FIG. 10 is a diagram illustrating a configuration of a color temperature adjustment unit according to a third embodiment.
Figure 11:
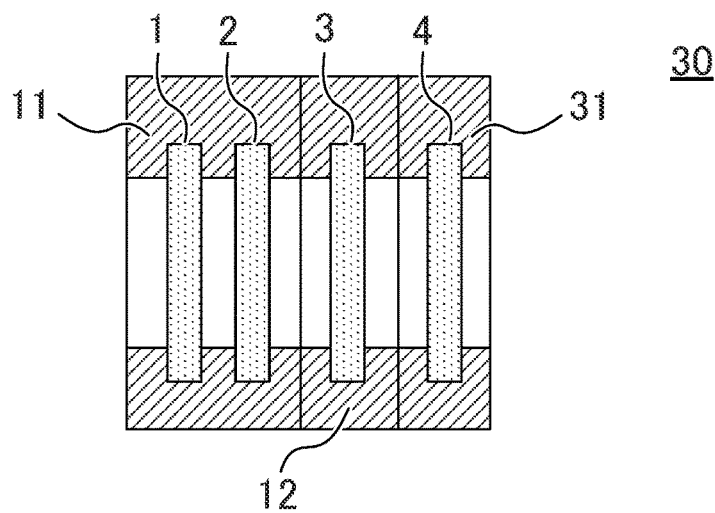
FIG. 11 is a diagram illustrating an example of a frame structure of the color temperature adjustment unit illustrated in FIG. 10.
Figure 12:
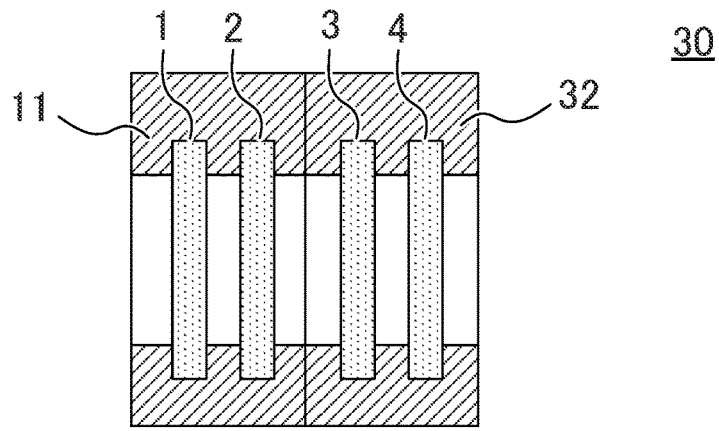
FIG. 12 is a diagram illustrating another example of the frame structure of the color temperature adjustment unit illustrated in FIG. 10.

FIG. 10 is a diagram illustrating a configuration of a color temperature adjustment unit 30 according to the present embodiment. FIGS. 11 and 12 are diagrams illustrating a frame structure of the color temperature adjustment unit 30. The color temperature adjustment unit 30 illustrated in FIG. 10 is different from the color temperature adjustment unit 10 in that a depolarization element 4 that is disposed on an emission side of the polarizer 3 is included. In the other points, the color temperature adjustment unit 30 is similar to the color temperature adjustment unit 10, and it is desirable that the color temperature adjustment unit 30 also include the indicator 13.

The depolarization element 4 is an element that scrambles linear polarization of light. It is sufficient if the depolarization element 4 disturbs polarized light and scrambles linear polarization of light. The depolarization element 4 may be, for example, a depolarizer that converts linearly polarized light into random polarized light, or may be a ¼λ plate (a second ¼λ plate) that converts at least light of a predetermined wavelength of linearly polarized light into circularly polarized light. The depolarization element 4 may be supported by a frame 31 that is different from the frame 12 that supports the polarizer 3, as illustrated in FIG. 11. However, in a case where the depolarization element 4 is the ¼λ plate, in order to fix the depolarization element 4 in a predetermined orientation relative to the polarizer 3, it is desirable that the polarizer 3 and the depolarization element 4 be supported by the same frame 32, as illustrated in FIG. 12.

The color temperature adjustment unit 30 also enables color temperature of light to be easily adjusted by only rotating the movable portion, and effects that are similar to effects of the color temperature adjustment unit 10 can be exhibited. Furthermore, the color temperature adjustment unit 30 is also similar to the color temperature adjustment unit 10 in that the color temperature adjustment unit 30 is compactly configured and can be relatively easily disposed in a light path of an existing optical instrument, and that the irregularity of polarized light is avoided and high color conversion performance can be achieved. Moreover, the color temperature adjustment unit 30 enables emitted light to be output as light that is not linearly polarized light, and only color temperature can be adjusted without changing a polarization state in response to incident light.

Note that the color temperature adjustment unit 30 may include the ¼λ plate 21 instead of the ¼λ plate 2. Stated another way, the depolarization element 4 may be provided in the color temperature adjustment unit 20 according to the second embodiment.

Fourth Embodiment

Figure 13:
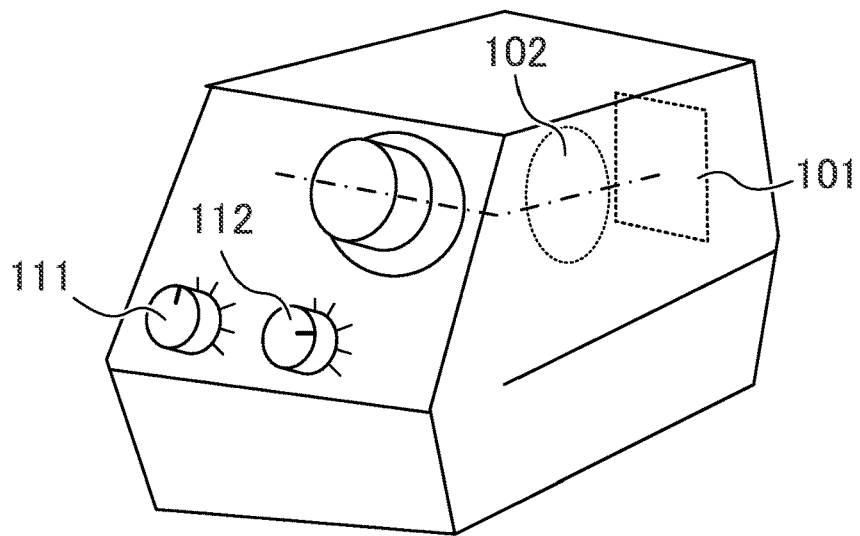
FIG. 13 is a diagram illustrating a configuration of a light source apparatus according to a fourth embodiment.

FIG. 13 is a diagram illustrating a configuration of a light source apparatus 100 according to the present embodiment. The light source apparatus 100 illustrated in FIG. 13 includes a semiconductor light source 101 and a color temperature adjustment unit 102. The semiconductor light source 101 is a semiconductor light source that emits white light, and is, for example, a white LED light source.

The color temperature adjustment unit 102 is, for example, the color temperature adjustment unit 10 according to the first embodiment, but may be a color temperature adjustment unit according to an arbitrary embodiment of the embodiments described above.

In the semiconductor light source 101, color temperature of white light to be emitted is fixed in contrast to a lamp light source such as a halogen lamp, and this easily causes a request to adjust color temperature in replacing a light source apparatus using the halogen lamp. A combination of the semiconductor light source 101 and the color temperature adjustment unit 102 enables color temperature to be easily adjusted.

Note that it is desirable that the light source apparatus 100 include an operation unit 111 that adjusts an amount of output light, and an operation unit 112 that adjusts color temperature. An operation performed on the operation unit 112 causes, for example, a polarizer included in the color temperature adjustment unit 102 to rotate, and as a result, a ¼λ plate included in the color temperature adjustment unit 102 rotates relative to the polarizer.

The light source apparatus 100 enables color temperature of emitted light to be adjusted by using the color temperature adjustment unit 102 included in the light source apparatus 100. Therefore, in replacing the light source apparatus using the halogen lamp, time and effort for separately incorporating means for adjusting color temperature into an optical instrument to be used in combination with the light source apparatus can be omitted.

Fifth Embodiment

Figure 14:
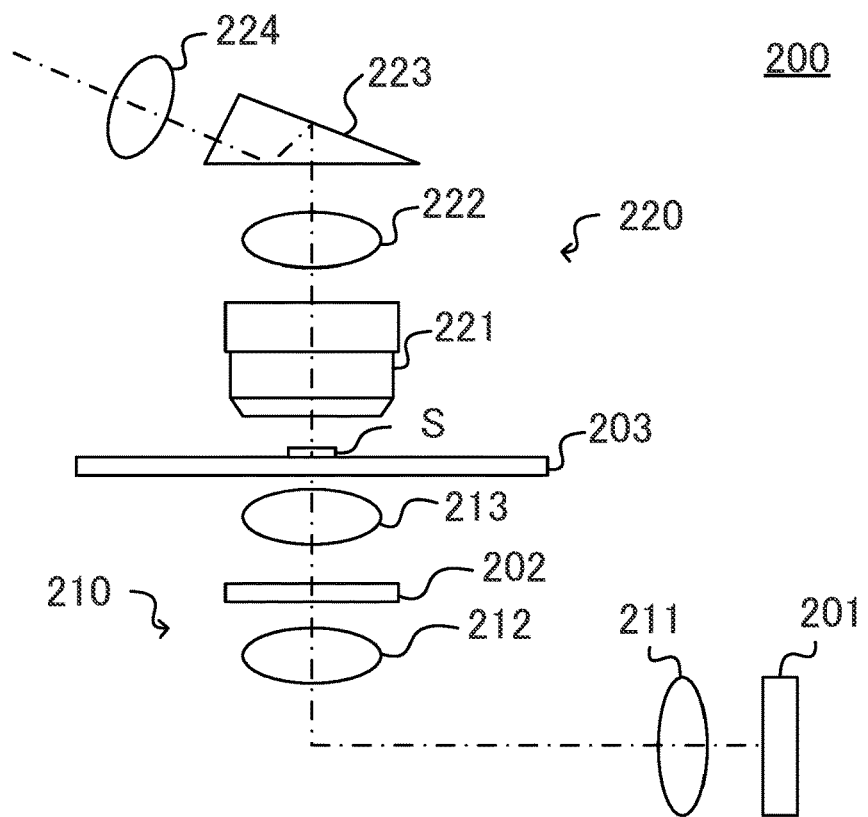
FIG. 14 is a diagram illustrating a configuration of a microscope apparatus according to a fifth embodiment.

FIG. 14 is a diagram illustrating a configuration of a microscope apparatus 200 according to the present embodiment. The microscope apparatus 200 illustrated in FIG. 14 includes a semiconductor light source 201, an illumination optical system 210 that irradiates a specimen S with white light, and a color temperature adjustment unit 202 that is disposed in a light path of the illumination optical system 210. The microscope apparatus 200 further includes an observation optical system 220.

The semiconductor light source 201 is a semiconductor light source that emits white light, and is, for example, a white LED light source. The color temperature adjustment unit 202 is, for example, the color temperature adjustment unit 10 according to the first embodiment, but may be a color temperature adjustment unit according to an arbitrary embodiment of the embodiments described above. The illumination optical system 210 includes a collector lens 211, a window lens 212, and a condenser lens 213. The observation optical system 220 includes an objective 221, a tube lens 222, a prism 223, and an eyepiece 224.

It is desirable that the color temperature adjustment unit 202 be disposed on a light path of the illumination optical system 210, as illustrated in FIG. 14. The reasons are as follows. In the color temperature adjustment unit 202, a plurality of optical elements is closely disposed. Therefore, if the color temperature adjustment unit 202 is disposed on a light path of the observation optical system 220, there is a possibility that flare caused by planar reflection in the color temperature adjustment unit 202 will adversely affect an observation image. Furthermore, the color temperature adjustment unit 202 includes a member (a second polarizer) that rotates around an optical axis. Therefore, if the color temperature adjustment unit 202 is disposed in a light path of the observation optical system, an image rotates in a case where the rotating member (the second polarizer) includes a wedge. For the reasons described above, it is desirable that the color temperature adjustment unit 202 be disposed on a light path of the illumination optical system.

The color temperature adjustment unit 202 may or may not include the depolarization element 4. However, in a case where the microscope apparatus 200 is a microscope that includes a binocular lens-barrel, such as a stereoscopic microscope, it is desirable that the depolarization element 4 be included. This is because if linearly polarized light enters a beam splitter in the binocular lens-barrel, a uniform amount of light is not guided to left-hand and right-hand light paths, a spectral distribution differs between the left-hand and right-hand light paths, or other cases occur.

The microscope apparatus 200 enables color temperature of illumination light to be adjusted by using the color temperature adjustment unit 202 included in the microscope apparatus 200. Therefore, even if a halogen lamp is replaced with an LED light source, a microscope apparatus having usability that does not change significantly can be provided to users.

The embodiments described above indicate specific examples for making the invention easily understandable, and the present invention is not limited to the embodiments described above. Variations of the embodiments described above and alternatives to the embodiments described above are to be included. In other words, variations can be made to constituent elements in each of the embodiments without departing from the spirit and scope of the embodiment. Furthermore, new embodiments can be implemented by appropriately combining a plurality of constituent elements disclosed in one or more of the embodiments. Furthermore, some constituent elements may be omitted from constituent elements in each of the embodiments, or some constituent elements may be added to constituent elements in each of the embodiments. Moreover, the order of the processing procedure described in each of the embodiments may be changed as long as there is no contradiction. Stated another way, the microscope apparatus and the light source apparatus of the present invention can be variously modified or changed without departing from the scope defined by the claims.

What is claimed is:

1. A microscope apparatus comprising a color temperature adjustment unit,
   wherein the color temperature adjustment unit includes, in order from an incident side of light:
   a first polarizer that converts the light into linearly polarized light;
   a ¼-wave plate that converts at least light of a predetermined wavelength of the linearly polarized light into circularly polarized light, the ¼-wave plate being fixed in a predetermined orientation relative to the first polarizer; and a second polarizer that extracts a predetermined polarization component, the second polarizer being disposed to be rotatable relative to the first polarizer, and a difference between a phase amount with respect to light of 435 nm and a phase amount with respect to light of 635 nm of the ¼-wave plate is 30 degrees or more.

2. The microscope apparatus according to claim 1, wherein
the ¼-wave plate includes two types of birefringent materials that are different in dispersion, the two types of birefringent materials being disposed to have slow axes that are orthogonal to each other.

3. The microscope apparatus according to claim 1, wherein
the color temperature adjustment unit further includes a depolarization element that scrambles linear polarization of light, the depolarization element being disposed on an emission side of the second polarizer.

4. The microscope apparatus according to claim 3, wherein
the depolarization element includes a second ¼-wave plate that converts at least light of a predetermined wavelength of linearly polarized light into circularly polarized light, the second ¼-wave plate being fixed in a predetermined orientation relative to the second polarizer.

5. The microscope apparatus according to claim 2, wherein
the color temperature adjustment unit further includes a depolarization element that scrambles linear polarization of light, the depolarization element being disposed on an emission side of the second polarizer.

6. The microscope apparatus according to claim 5, wherein
the depolarization element includes a second ¼-wave plate that converts at least light of a predetermined wavelength of linearly polarized light into circularly polarized light, the second ¼-wave plate being fixed in a predetermined orientation relative to the second polarizer.

7. The microscope apparatus according to claim 1, wherein
the color temperature adjustment unit further includes an indicator relating to color conversion capability, the indicator indicating a value that changes according to rotation of the second polarizer relative to the first polarizer.

8. The microscope apparatus according to claim 2, wherein
the color temperature adjustment unit further includes an indicator relating to color conversion capability, the indicator indicating a value that changes according to rotation of the second polarizer relative to the first polarizer.

9. The microscope apparatus according to claim 3, wherein
the color temperature adjustment unit further includes an indicator relating to color conversion capability, the indicator indicating a value that changes according to rotation of the second polarizer relative to the first polarizer.

10. The microscope apparatus according to claim 4, wherein
the color temperature adjustment unit further includes an indicator relating to color conversion capability, the indicator indicating a value that changes according to rotation of the second polarizer relative to the first polarizer.

11. The microscope apparatus according to claim 5, wherein
the color temperature adjustment unit further includes an indicator relating to color conversion capability, the indicator indicating a value that changes according to rotation of the second polarizer relative to the first polarizer.

12. The microscope apparatus according to claim 6, wherein
the color temperature adjustment unit further includes an indicator relating to color conversion capability, the indicator indicating a value that changes according to rotation of the second polarizer relative to the first polarizer.

13. The microscope apparatus according to claim 1, further comprising:
a semiconductor light source that emits white light; and
an illumination optical system that irradiates a specimen with the white light,
wherein the color temperature adjustment unit is disposed on a light path of the illumination optical system.

14. The microscope apparatus according to claim 13, wherein
the semiconductor light source includes a white LED light source.

15. A light source apparatus comprising:
a semiconductor light source that emits white light; and
a color temperature adjustment unit,
wherein the color temperature adjustment unit includes, in order from an incident side of light:
a first polarizer that converts the light into linearly polarized light;
a ¼-wave plate that converts at least light of a predetermined wavelength of the linearly polarized light into circularly polarized light, the ¼-wave plate being fixed in a predetermined orientation relative to the first polarizer; and
a second polarizer that extracts a predetermined polarization component, the second polarizer being disposed to be rotatable relative to the first polarizer, and
a difference between a phase amount with respect to light of 435 nm and a phase amount with respect to light of 635 nm of the ¼-wave plate is 30 degrees or more.

16. The light source apparatus according to claim 15, wherein
the semiconductor light source includes a white LED light source.

* * * * *